US006162090A

United States Patent [19]

Klübenspies et al.

[11] Patent Number: 6,162,090

[45] Date of Patent: Dec. 19, 2000

[54] PRINTED CIRCUIT BOARD WITH A COUPLING ELEMENT OF A PLUG-IN DEVICE

[75] Inventors: Dieter Klübenspies, Kelkheim; Manfred Zeiss, Rüsselsheim, both of Germany

[73] Assignee: Mannesmann VDO AG, Frankfurt, Germany

[21] Appl. No.: 09/288,383

[22] Filed: Apr. 8, 1999

[30] Foreign Application Priority Data

Apr. 9, 1998 [DE] Germany ........................... 198 16 126

[51] Int. Cl.[7] .............................. H01R 13/73; H02B 1/01

[52] U.S. Cl. ............................................ 439/564; 439/567

[58] Field of Search ..................................... 439/561, 560, 439/550, 555, 562, 82, 569, 564, 565, 573, 567

[56] References Cited

U.S. PATENT DOCUMENTS 4,076,165 2/1978 Latasiewicz et al. ................... 228/136
5,540,598 7/1996 Davis ........................................ 439/79

FOREIGN PATENT DOCUMENTS 730277 1/1995 Japan ............................... H05K 9/00

*Primary Examiner*—Neil Abrams
*Assistant Examiner*—Hae Moon Hyeon
*Attorney, Agent, or Firm*—Martin A. Farber

[57] ABSTRACT

A printed circuit board, in particular for a display instrument in a motor vehicle, having a coupling element of a plug-in device and having one or more clearances and one or more terminal contacts of the coupling element which pass through the clearances, the coupling element having a base connected to the printed circuit board and the terminal contact or contacts on the side of the printed circuit board which is facing away from a coupling region of the coupling element being electrically connected to said printed circuit board.

To simplify the production of the printed circuit board, the base of the coupling element has a connecting element which passes through the printed circuit board in a clearance, can be twisted about an axis running approximately perpendicularly with respect to the printed circuit board and locks the coupling element to the printed circuit board, and the clearance through which the connecting element passes is arranged in a plane approximately parallel to the printed circuit board at an angle with respect to the connecting element and that the connecting element is twisted when it is inserted into the clearance.

23 Claims, 4 Drawing Sheets

PRINTED CIRCUIT BOARD WITH A COUPLING ELEMENT OF A PLUG-IN DEVICE

FIELD AND BACKGROUND OF THE INVENTION

The invention relates to a printed circuit board, in particular for a display instrument in a motor vehicle, having a coupling element of a plug-in device and having one or more clearances and one or more terminal contacts of the coupling element which pass through the clearances, the coupling element having a base connected to the printed circuit board and the terminal contact or contacts on the side of the printed circuit board which is facing away from a coupling region of the coupling element being electrically connected to said printed circuit board.

Such printed circuit boards are widely encountered, for example in modern instrument clusters of motor vehicles, and are therefore known. A coupling element designed as a connector receptacle serves in this case for the electrical connection of the printed circuit board to an electrical connector, by means of which the data exchange of the instrument cluster with vehicle electronics for activating the individual displays of the instrument cluster takes place in particular. Fastening of the connector receptacle on the printed circuit board and the required contacting of the electrical conductors of the receptacle with conductor tracks of the printed circuit board are complex operations here. It is necessary to position the connector receptacle and the printed circuit board exactly with respect to each other, join them and caulk them. In this way, a mechanical connection is achieved between the printed circuit board and the connector receptacle. In addition, the electrical conductors of the connector receptacle also have to be contacted with the printed circuit board, which is carried out for example by means of a wave-soldering process. In particular, the first-mentioned steps of joining and connecting the connector receptacle to the printed circuit board are complicated and time-consuming and, particularly when manufacturing large numbers in automated mass production, represent a considerable obstacle.

SUMMARY OF THE INVENTION

The invention is based on the object of providing a printed circuit board with a coupling element of a plug-in device of the aforementioned type which ensures simple and positionally accurate assembly as well as a secure and durable mechanical connection of the two components.

This object is achieved according to the invention by the base of the coupling element having a connecting element which passes through the printed circuit board in a clearance, can be twisted about an axis running approximately perpendicularly with respect to the printed circuit board and locks the coupling element to the printed circuit board, by the clearance through which the connecting element passes being arranged in a plane approximately parallel to the printed circuit board at an angle with respect to the connecting element and by the connecting element being twisted when it is inserted into the clearance. With the printed circuit board according to the invention it is no longer necessary to connect the coupling element and the printed circuit board to each other in an additional operation by caulking, screwing or the like. In addition, there is also no longer any need for exact positioning before the joining of the two elements, since the arrangement of the connecting element and the clearance at an angle with respect to each other brings about an automatic positional alignment when the printed circuit board and coupling element are brought together. Furthermore, it is favorable that the connection is secured by a locking engagement, so that the printed circuit board and coupling element can be separated from each other again if required, which would not be possible without damage in the case of caulking for example.

It is conceivable for the base of the coupling element to be locked to the printed circuit board merely by means of a single connecting element. However, the connection is advantageously particularly strong and positionally secure if two connecting elements are provided, arranged on opposite side of the base.

According to another advantageous development of the invention, the clearance passed through by the connecting element is joined to the clearance or one of the clearances passed through by the terminal contact or contacts, forming a common clearance. In this case, it is possible, for example, for one side of a clearance passed through by one or more terminal contacts to be designed in such a way that it serves as a passage for the connecting element. In this way, the processing of the printed circuit board is considerably simpler and expenditure on tools necessary for this is reduced.

The positioning accuracy of the coupling element is preferably increased by the base having a pin passing approximately perpendicularly through a clearance in the printed circuit board. It is of further advantage in this case if two pins are provided, arranged on opposite sides of the base and respectively passing approximately perpendicularly through a clearance in the printed circuit board, so that a mutual arrangement of the coupling element with respect to the printed circuit board which is secure against twisting can also be achieved in particular. To facilitate the joining of the components, it is favorable if the pin or pins is or are designed such that they widen conically at their free end, counter to the joining direction. A coding of the installation position of the coupling element on the printed circuit board can be achieved in a particularly simple way by the pins having a different cross-sectional shape or size.

During connecting or separating of the coupling element, which may be designed for example as a male multipoint connector, into which coupling element there is inserted a connector, for example designed as a female multipoint connector, as the second coupling element, no forces which can lead to the contacting being destroyed may be transferred to the connecting region of the terminal contacts with the printed circuit board. Therefore, according to another advantageous development of the invention, the base has a flange which runs approximately parallel to the printed circuit board and can be brought to bear against the latter. This has the effect that external forces acting on the base are transferred directly to the printed circuit board, without exerting any load on the contacting of the terminal contacts.

For a secure connection of the coupling element and printed circuit board, it is important that the connecting element has adequate torsional rigidity, even under the influence of varying ambient temperatures. It is of particular advantage if the connecting element consists of sheet metal or plastic and can consequently be manufactured simply and at low cost as well as in large numbers.

Since the connecting element serves both for an accurately directed joining of the coupling element and printed circuit board and for a locking of these elements and their secure hold, it is of particular advantage if the connecting element has, lying one behind the other contrary to a direction of insertion into the printed circuit board, an inserting and holding portion and a torsional portion. It is conceivable for the connecting element to be configured as a structural element forming a single component with the coupling element, in which case a thermally stable plastic could be chosen, for example, as the material. For a material selection which is optimized with respect to the tasks of the individual components, a sheet metal being chosen for example for the connecting element and a plastic being chosen for the coupling element, it may be necessary, however, to form the connecting element and coupling element as individual components which, however, have to be connected to each other. It is of particular advantage here if the connecting element has adjoining the torsional portion, contrary to the direction of insertion, a fastening portion in order to permit its arrangement on the coupling element. In this case, this arrangement is advantageously particularly simple if the base has a clearance into which the fastening portion of the connecting element can be inserted.

According to another advantageous development of the invention, the connecting element has a constriction in the region of the torsional portion. This achieves the effect that the connecting element can be twisted particularly well and a complex shaping of the torsional portion is not required.

It is particularly advantageous if, according to another development of the invention, the inserting and holding portion is wedge-shaped in the direction of insertion. As a result, when the connecting element is inserted into the clearance in the printed circuit board it is centered of its own accord, as a result of which this joining operation can be automated, and consequently can be carried out by machine, in a particularly advantageous way.

To ensure a secure and firm seating of the coupling element on the printed circuit board, an exact tolerancing of the coupling element, the connecting element, the clearance and the height of the printed circuit board is required. This entails high production expenditure. To make it possible in a simple way to obtain a firm seating of the coupling element on the printed circuit board and tolerance compensation of the same time, it is particularly advantageous if the inserting and holding portion merges in a wedge-shaped manner into the torsional portion contrary to the direction of insertion. In this way, the coupling element and printed circuit board are always in a rigid, centered arrangement in relation to each other.

It would be conceivable, for example, to design the connecting element three-dimensionally, which would cause considerable production expenditure, however. The manufacturing expenditure for the connecting element is advantageously particularly small and the material expenditure is low if the connecting element is approximately planar.

According to another advantageous development of the invention, the clearance passed through by the connecting element is slit-shaped. The mutually opposite, parallel side edges of the slit in this case ensure a particularly precise guidance of a connecting element of which the inserting and holding portion is wedge-shaped in the direction of insertion. The same applies to the locked state of the connecting element if the inserting and holding portion of the latter merges in a wedge-shaped manner into the torsional portion contrary to the direction of insertion.

A twisting of the connecting element that is particularly easy but adequate for secure holding when it is inserted into the clearance in the printed circuit board is advantageously achieved if the angle between the clearance passed through by the connecting element and the connecting element is about 20°.

The coupling element is of particularly great stability if it preferably has one or more clearances into which the terminal contact or contacts can be inserted. The clearances in this case serve at the same time as stabilizing guides of the terminal contacts.

It would be conceivable to provide straight terminal contacts which are connected to the printed circuit board by wave soldering, for example. According to another development of the invention, however, it is particularly advantageous if the terminal contact or contacts are L-shaped, a first leg of the L being contacted with the printed circuit board and the second leg of the L ending in the coupling region of the coupling element. Consequently, the leg of the L contacted with the printed circuit board both allows a tolerance compensation of the components to be achieved and additionally allows a mechanical loading of the connection between the terminal contacts and the printed circuit board to be avoided to the greatest extent. For soldering the terminal contacts and printed circuit board in infrared or convection ovens, which are preferably used when soldering surface-mounted devices, it is advantageous if the leg contacted with the printed circuit board is convexly arched in the contacting region, in the direction in which the leg extends, forming a point contact or linear contact, perpendicular to the direction in which the leg extends, of the printed circuit board.

The coupling element connected to the printed circuit board is preferably able to be connected to a counter-coupling in a particularly secure and durable manner if the coupling element has in its coupling region a groove running at least part of the way around it, into which a clip can be inserted. The two coupling elements can be locked to each other by this clip.

According to another advantageous development of the invention, the coupling element passes completely through the printed circuit board in a clearance. In this case, the coupling element may be brought to bear against the printed circuit board by a flange of its base, from the side of the printed circuit board on which the terminal contacts are to be connected to the latter, and the remaining part of the coupling element may be led through the printed circuit board. This is particularly favourable if L-shaped terminal contacts are provided, the ends of which to be contacted can in this way be brought simply to bear against conductor tracks of the printed circuit board.

It is also conceivable, however, that the coupling element can be advantageously placed on the side of the printed circuit board facing its coupling region, the terminal contact or contacts passing through the printed circuit board in a common clearance or in a clearance for each. This embodiment is suitable, for example, if for process-engineering reasons, it is not possible during the manufacture of the printed circuit board for the coupling element to be fed in on the side of the printed circuit board away from the coupling region.

BRIEF DESCRIPTION OF THE DRAWINGS

The invention allows numerous embodiments. For further illustration of its basic principle, one of these is explained in more detail on the basis of an exemplary embodiment represented in the attached drawings, in which.

DETAILED DESCRIPTION OF THE PREFERRED EMBODIMENT

Figure 1:
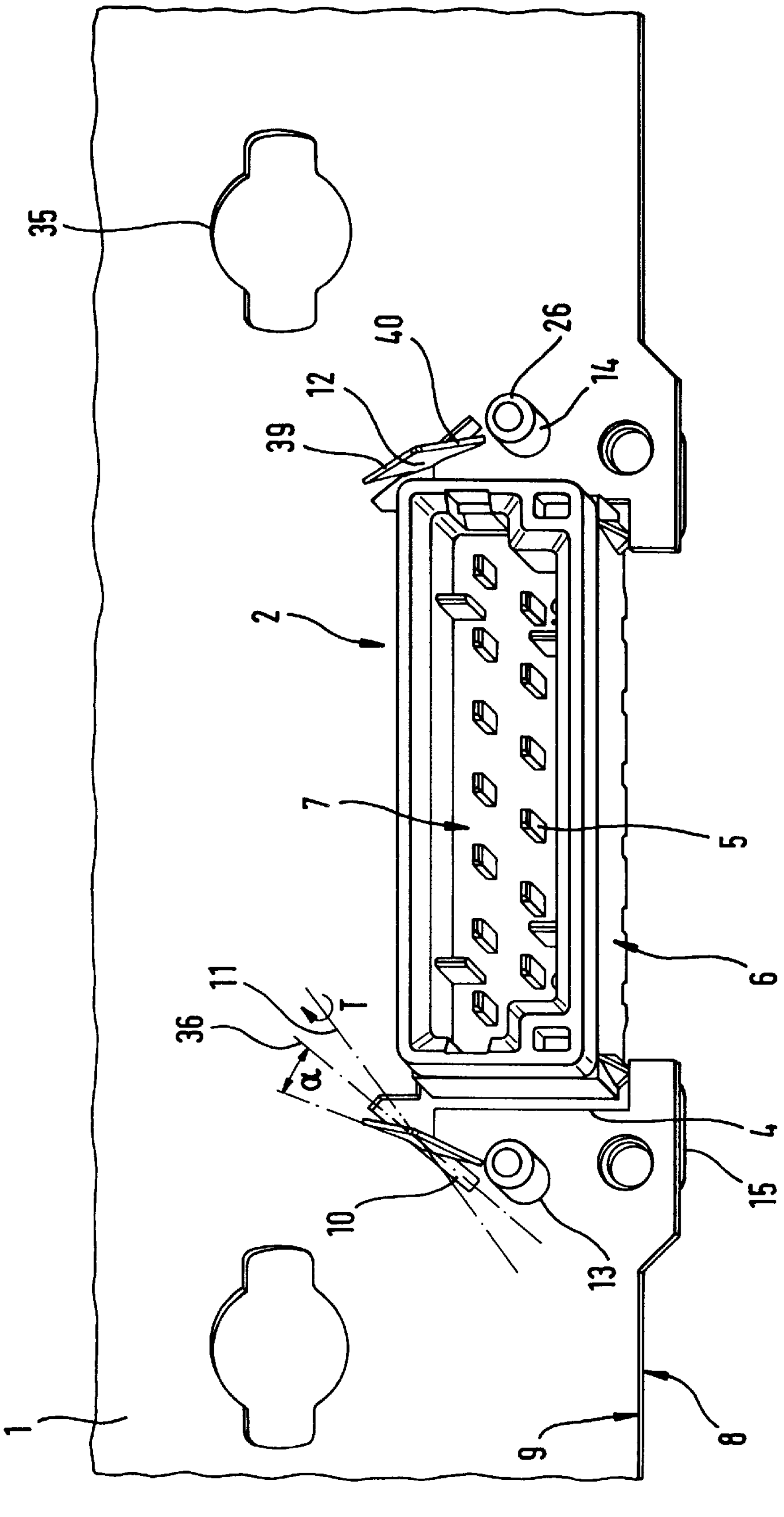
FIG. 1 shows a printed circuit board according to the invention, with a coupling element of a plug-in device, in a perspective view.

FIG. 1 shows a detail of a printed circuit board 1 of an instrument cluster of a motor vehicle. The printed circuit board 1 has in a clearance (aperture) 4 a coupling element 2 of a plug-in device. Hereinafter clearances mean apertures, passageways, openings, holes, slots, slits, cavities, recesses or the like. The coupling element 2 is in this case designed as a male multipoint connector. In the printed circuit board 1 there can also be seen clearances (openings) 35, which serve for receiving lighting elements (not shown), for example bulbs, for illuminating displays of the instrument cluster.

The coupling element 2 is provided in its interior with a plurality of terminal contacts 5, the first end regions of which are arranged in a coupling region 7 of the coupling element 2, for electrical connection with a corresponding coupling element (not shown here), which can be inserted into the coupling region 7 of the coupling element 2. In addition, the coupling element 2 has a base 6, which serves for the mechanical connection of the coupling element 2 to the printed circuit board 1. The base 6 has on each of two opposite sides a flange 15, the flanges 15 extending approximately parallel to the printed circuit board 1, bearing against the latter and thus supporting the coupling element 2 on the printed circuit board 1. On the flanges 15 of the base 6 there is additionally in each case a pin 14, which engages in a corresponding clearance (pin hole) 13 in the printed circuit board 1 and thus centers the coupling element 2. To simplify the assembly of the coupling element 2 and printed circuit board 1, the free end 26 of the pins 14 has a shape tapering conically in the direction of insertion of the coupling element 2 into the printed circuit board 1, so that an automatic positioning of the coupling element 2 takes place. In the installed state, the flanges 15 of the base 6 bear against the side 8 of the printed circuit board 1 facing away from the coupling region 7 of the coupling element 2. At least on this side 8 facing away from the coupling region 7, the printed circuit board 1 is laminated, that is to say is provided with conductor tracks (not shown here). In addition, a lamination may also be provided on a side 9 of the printed circuit board 1 facing the coupling region 7.

FIG. 1 also reveals two slit-shaped clearances (slits) 10, the alignment of which is described by center axes 36 and which respectively receive a connecting element 12 of the coupling element 2. The center axis 36 of one clearance 10 is in this case arranged at an angle $\alpha$ of about 20° with respect to the transverse extent of the approximately planar connecting element 12.

Figure 2:
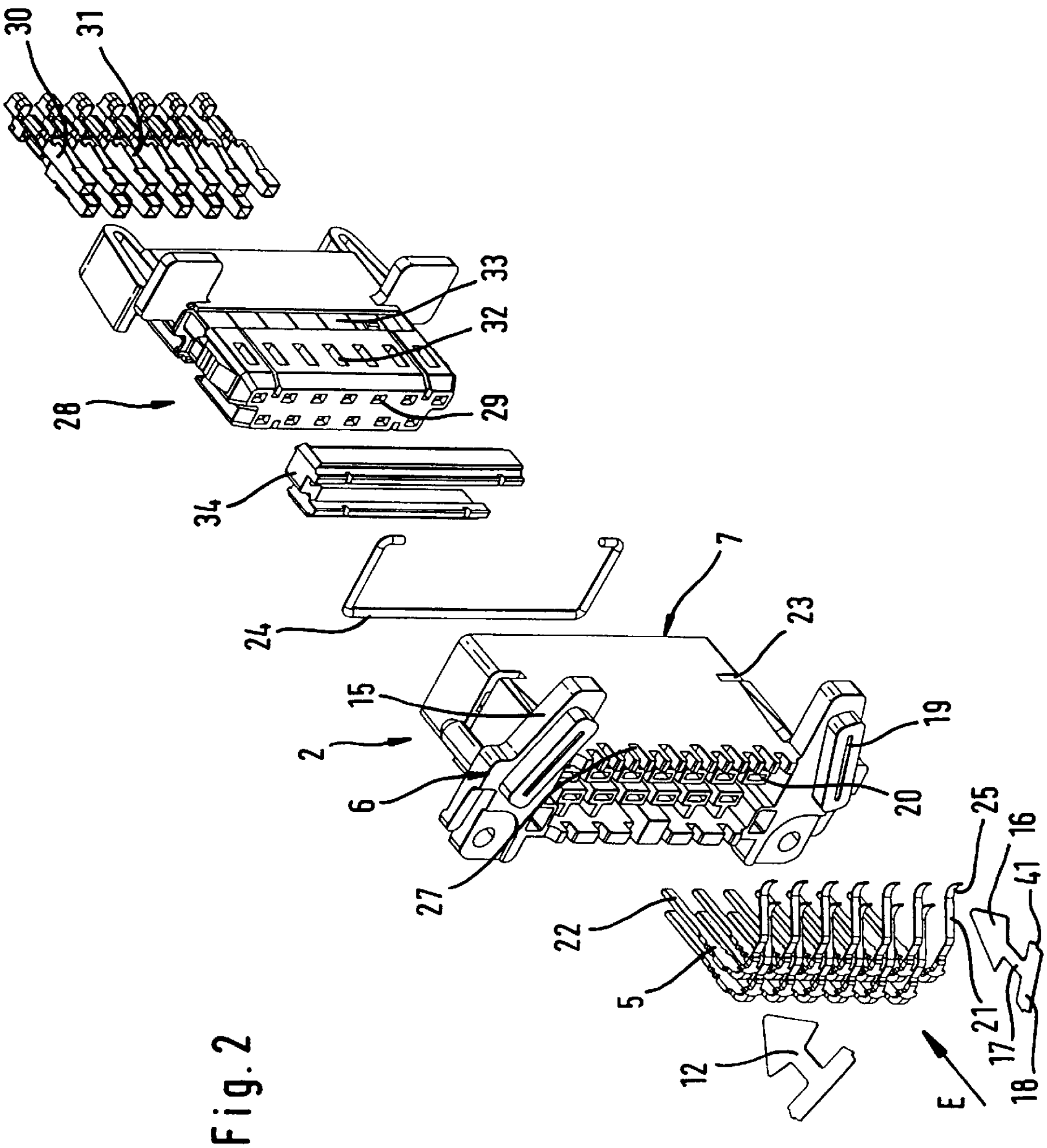
FIG. 2 shows the coupling element from FIG. 1 with a second, corresponding coupling element of the adjusting device, in an exploded representation.
Figure 4:
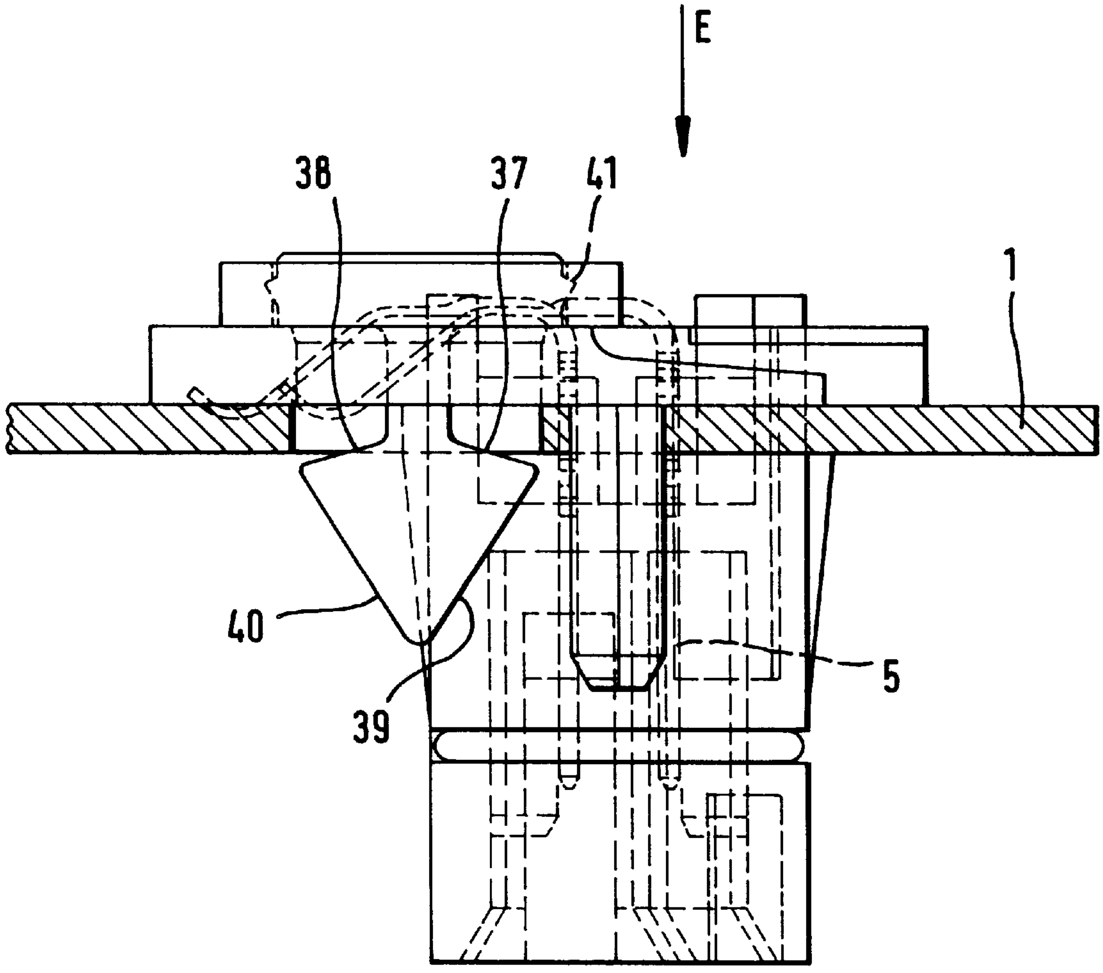
FIG. 4 shows a partially sectional side view of the printed circuit board from FIG. 1.

The shape of the connecting element 12 is evident from FIG. 2. The connecting element 12 is of a wedge-shaped design and has at its end away from the tip a fastening portion 18, by which it is inserted into an open slot 19 in the base 6 of the coupling element 2. The connecting element 12 may be held in the open slot 19 of its own accord, for example on account of a slight convexity of its own, but it may additionally be fixed by adhesive. In the present example, the connecting element 12 is a sheet-metal component, and the coupling element 2 designed as a male multipoint connector is injection-molded from a plastic; during the joining of the coupling element 2 and connecting element 12, lugs 41 laterally on the fastening portion 18 therefore dig into the plastic of the coupling element 2 and securely hold the connecting element 12. The coupling element is inserted into the printed circuit board 1 in a direction of insertion E. The base 6 thereby passes through the clearance aperature 4 in the printed circuit board 1, the pins 14 engage in the clearances (pin holes) 13 and the connecting elements 12 engage in the slit-like clearances (slits) 10. In this case, each connecting element 12 runs with insertion edges 39 and 40 of an inserting and holding portion 16 on side edges of the slit-shaped clearance (slit) 10. On account of the clearance (slit) 10 and connecting element 12 being arranged at an angle $\alpha$, said connecting element is twisted about a torsion axis 11 running in its longitudinal direction. This twisting in the direction of twisting T indicated in FIG. 1 takes place primarily in a torsional portion 17 of the connecting element 12 arranged between the fastening portion 18 and the inserting and holding portion 16. When the inserting and holding portion 16 has passed completely through the clearance 10, it turns back of its own accord on account of the resilient properties of the connecting element 12. Supporting edges 37 and 38 (cf. FIG. 4) of the inserting and holding portion 16 thereby come to bear on side edges of the clearance 10. The inserting and holding portion 16 merges in a wedge-shaped manner into the torsional portion 17, counter to the direction of insertion E of the coupling element 2 into the printed circuit board 1, so that the supporting edges 37 and 38 run at an angle of more than 90° in the direction of insertion E with respect to a longitudinal axis of the connecting element 12. This ensures that the coupling element 2 and the printed circuit board 1 are flush against each other and there is consequently no backlash between these two components.

As FIG. 2 reveals, the coupling element 2 has in the longitudinal direction a multiplicity of through-clearances (terminal passageways) 20, into which L-shaped terminal contacts 5 are inserted and stabilized in grooves 27. In the assembled state of the coupling element 2, a first leg 21 of the L-shaped terminal contacts 5 is contacted with a printed circuit board (not shown here) and a second leg 22 of the L ends in the coupling region 7 of the coupling element 2. To ensure a defined bearing contact of the first leg 21 on the printed circuit board, the leg 21 contacted with the printed circuit board is provided in the contacting region with a bend 25, so that it bears against the printed circuit board with a point contact or a linear contact, perpendicular to the direction in which the leg 21 extends. A defined bearing contact of the terminal contacts 5 on the printed circuit board 1, which is achieved by the arrangement of the coupling element 2 and printed circuit board 1 without backlash described above, is necessary to be able to carry out exact soldering of the terminal contacts 5 to the printed circuit board 1. For this purpose it is important that the terminal contacts 5 press with their bend 25 in a defined manner into a soldered paste applied beforehand to the printed circuit board.

Also shown in FIG. 2 is a second coupling element 28, which is designed in the form of a female multipoint connector, corresponds to the first coupling element 2 and can be inserted into the latter. For this purpose, the second coupling element 28 has a plurality of longitudinally directed clearances (cavities) 29. The clearances 29 have in each case an additional clearance (slot) 32, perpendicularly to the direction in which they extend. Inserted into the clearances 29 are terminal contacts 30, which serve for the contacting with terminal contacts 5 of the first coupling element 2. The terminal contacts 30 are provided in each case in a side region with a spring tab 31, which engages in the lateral clearance (slot) 32 of the clearances (cavities) 29 and locks the terminal contacts 30 securely in the coupling element 28. In addition, the terminal contacts 30 are additionally locked by means of a bar 34, which is pushed into a groove 33 running part of the way around the outside of the coupling element 28.

The first coupling element 2 has in its coupling region 7 a groove 23 running part of the way around it and into which a clip 24 is inserted. The clip 24 locks the first coupling element 2 and the second coupling element 28 when they have been joined together.

Figure 3:
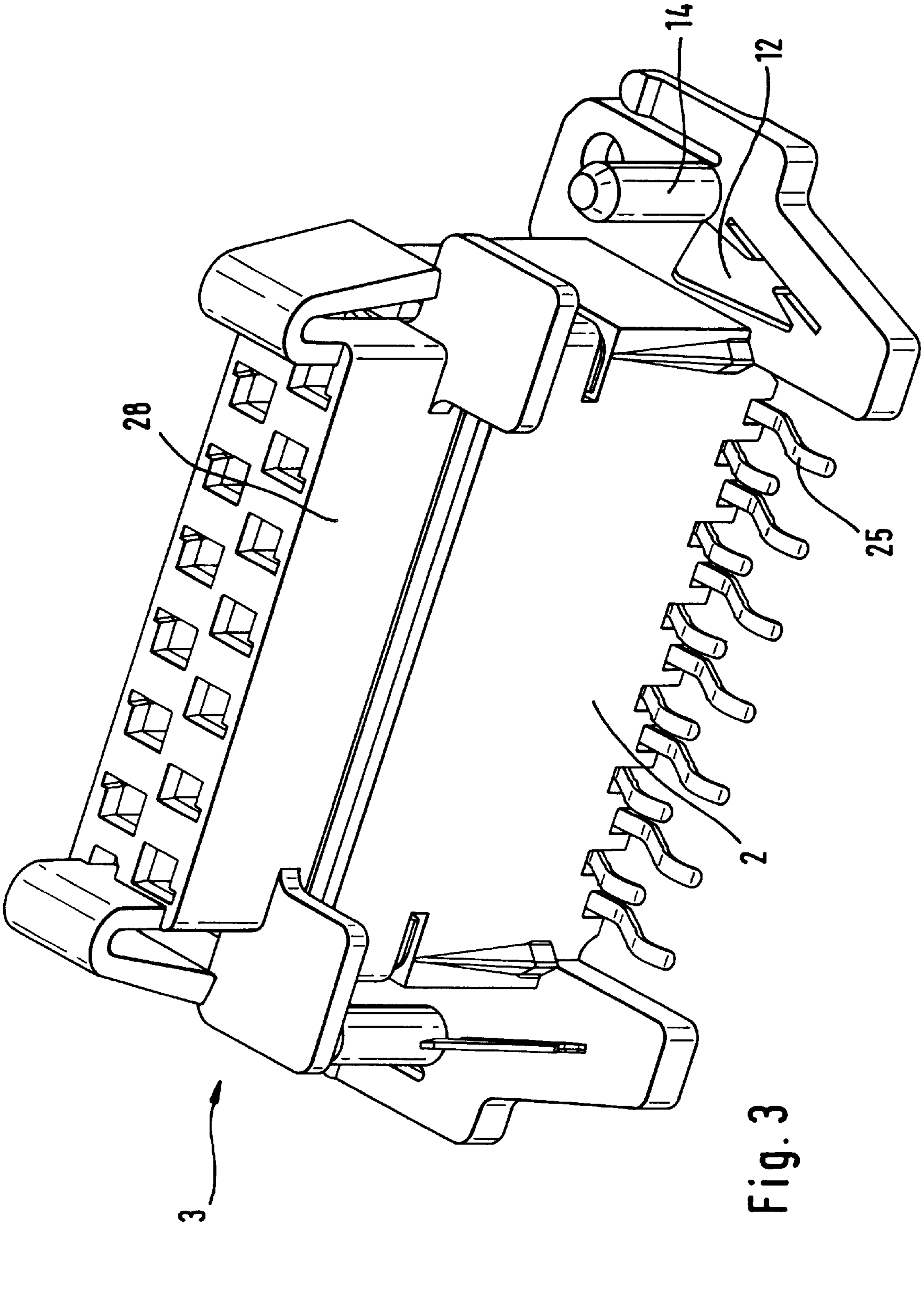
FIG. 3 shows two coupling elements according to FIG. 2 inserted one in the other, without a printed circuit board.

A corresponding plug-in connection 3 with the first coupling element 2 and the second coupling element 28 inserted therein is shown in fig. 3, but for the sake of overall clarity without a printed circuit board.

What is claimed is:

1. A printed circuit board, in particular for a display instrument in a motor vehicle, comprising a printed circuit board, and a coupling element of a plug-in device, said printed circuit board having one or more clearances, the coupling element having one or more terminal contacts, the coupling element having a base connectable to the printed circuit board, and the terminal contact or contacts being, on a first side of the printed circuit board facing away from a coupling region of the coupling element, electrically connected to said printed circuit board, wherein the base (6) of the coupling element (2) has a connecting element (12), said connecting element passes through the printed circuit board (1) in one of said clearances (10) in the printed circuit board (1), is twistable about an axis (11) extending approximately perpendicularly with respect to the printed circuit board (1) and locks the coupling element (2) to the printed circuit board (1), wherein said one of said clearances (10) is arranged in a plane approximately parallel to the printed circuit board (1) at an angle (a) with respect to the connecting element (12) and wherein the connecting element (12) is twisted when said connecting element is inserted into said one of said clearances (10).

2. The printed circuit board as claimed in claim 1, wherein two of said connecting elements (12) are provided, arranged on opposite sides of the base (6).

3. The printed circuit board as claimed in claim 1, wherein said one of said clearances (10) is joined to at least one aperture (4) in said printed circuit board (1) forming a common clearance, said coupling element passes through said at least one aperture, and said at least one terminal contact passes through said coupling element.

4. The printed circuit board as claimed in claim 1, wherein the base (6) has a pin (14) passing approximately perpendicularly through a pin hole (13) in the printed circuit board (1).

5. The printed circuit board as claimed in claim 4, wherein two said pins (14) and two said pin holes are provided, arranged on opposite sides of the base (6) and correspondingly on said printed circuit board (1), respectively and said pins respectively passing approximately perpendicularly through the pin holes (13) in the printed circuit board (1).

6. The printed circuit board as claimed in claim 1, wherein the base (6) has a flange (15) which extends approximately parallel to the printed circuit board (1) and is abuttable against the printed circuit board.

7. The printed circuit board as claimed in claim 1, wherein the connecting element (12) is made of sheet metal or plastic enabling its twistability and returnability, respectively.

8. The printed circuit board as claimed in claim 1, wherein the connecting element (12) has an inserting and holding portion (16) and therebehind a torsional portion (17), said portions being one behind the other opposite to a direction of insertion (E) of the connecting element into said one of said clearances in the printed circuit board (1).

9. The printed circuit board as claimed in claim 8, wherein the connecting element (12) has a fastening portion (18) adjoining the torsional portion (17), opposite to said direction of insertion (E) of said connecting element.

10. The printed circuit board as claimed in claim 9, wherein the base (6) has an open slot (19) into which the fastening portion (18) of the connecting element (12) is inserted.

11. The printed circuit board as claimed in claim 8, wherein the connecting element (12) forms a constriction in its region of the torsional portion (17).

12. The printed circuit board as claimed in claim 8, wherein said inserting and holding portion (16) is wedge-shaped in said direction of insertion (E).

13. The printed circuit board as claimed in claim 8, wherein the inserting and holding portion (16) merges in a wedge-shaped manner into the torsional portion (17) opposite to said direction of insertion (E).

14. The printed circuit board as claimed in claim 1, wherein said connecting element (12) is approximately planar.

15. The printed circuit board as claimed in claim 1, wherein said one of said clearances (10) is slit-shaped.

16. The printed circuit board as claimed in claim 1, wherein the angle ($\alpha$) between said one of said clearances (10) and the connecting element (12) is about 20°.

17. The printed circuit board as claimed in claim 1, wherein the coupling element (2) has one or more terminal passageways (20) into which the terminal contact or contacts (5) are insertable.

18. The printed circuit board as claimed in claim 17, wherein the terminal contact or contacts (5) are L-shaped, a first leg (21) of the L being electrically contacted with the printed circuit board (1) at said first side of the printed circuit board, and the second leg (22) of the L has an end lying in the coupling region (7) of the coupling element (2) at a second side of the printed circuit board opposite to said first side.

19. The printed circuit board as claimed in claim 18, wherein the first leg (21) contacted with the printed circuit board (1) is convexly arched (bend 25) in a contacting region, in a direction in which the first leg extends, forming a point contact or linear contact, perpendicular to the direction in which the leg extends, of the printed circuit board.

20. The printed circuit board as claimed in claim 1, wherein the coupling element (2) has in said coupling region (7) a groove (23) running at least partly therearound, and a clip (24) is insertable into said groove.

21. The printed circuit board as claimed in claim 1, wherein the coupling element (2) passes completely through the printed circuit board (1) in another of said clearances constituting an aperture (4) in the printed circuit board.

22. The printed circuit board as claimed in claim 1, wherein the coupling element is positionable on a second side, opposite to said first side, of the printed circuit board facing said coupling region, the terminal contact or contacts passing through the printed circuit board in a common another of said clearances or in said another said clearances for each said terminal contacts respectively.

23. The printed circuit board as claimed in claim 8, wherein said one of said clearances is a slit in said printed circuit board, and wherein said connecting element is resilient and after twisting via said torsional portion while its said inserting and holding portion passes through said slit, turns back via said torsional portion, thereby locking said coupling element to said printed circuit board.

* * * * *